US012786482B2

(12) United States Patent
Salinger et al.

(10) Patent No.: US 12,786,482 B2
(45) Date of Patent: Nov. 3, 2026

(54) CONTROL PLANE ARCHITECTURE FOR MULTICAST CACHE-FILL

(71) Applicant: Comcast Cable Communications, LLC, Philadelphia, PA (US)

(72) Inventors: Jorge Salinger, Littleton, CO (US); Weidong Mao, West Windsor, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 572 days.

(21) Appl. No.: 17/071,146

(22) Filed: Oct. 15, 2020

(65) Prior Publication Data

US 2021/0105509 A1 Apr. 8, 2021

Related U.S. Application Data

(60) Continuation of application No. 16/396,960, filed on Apr. 29, 2019, now Pat. No. 10,856,014, which is a (Continued)

(51) Int. Cl.

*H04N 21/21* (2011.01)
*H04L 9/40* (2022.01)

(Continued)

(52) U.S. Cl.

CPC ......... *H04N 21/21* (2013.01); *H04L 47/2433* (2013.01); *H04L 63/0428* (2013.01); *H04L 67/1014* (2013.01); *H04L 67/1021* (2013.01); *H04L 67/303* (2013.01); *H04N 7/17318* (2013.01); *H04N 21/2343* (2013.01); *H04N 21/2365* (2013.01); *H04N 21/2368* (2013.01); *H04N 21/2389* (2013.01); *H04N 21/24* (2013.01); *H04N 21/25841* (2013.01); *H04N 21/266* (2013.01); *H04N 21/4353* (2013.01);

(Continued)

(58) Field of Classification Search

None

See application file for complete search history.

(56) References Cited

U.S. PATENT DOCUMENTS 6,112,239 A 8/2000 Kenner et al.
7,428,725 B2 9/2008 Niyogi et al.

(Continued)

FOREIGN PATENT DOCUMENTS

EP 1376990 A2 1/2004
JP 5321535 B2 10/2013

(Continued)

OTHER PUBLICATIONS

International Search Report for PCT/US2010/048974, mailed Nov. 3, 2010.

(Continued)

*Primary Examiner* — Mohammad S Adhami
(74) *Attorney, Agent, or Firm* — Banner & Witcoff, Ltd.

(57) ABSTRACT

A multicast content delivery system can use both multicast and unicast streams to efficiently use available bandwidth to deliver content. Available multicast content can be identified to gateways serving consumption devices, and the gateways can receive requests for unicast content deliver, but honor the requests with multicast group sessions.

20 Claims, 10 Drawing Sheets

Related U.S. Application Data continuation of application No. 15/604,110, filed on May 24, 2017, now Pat. No. 10,327,012, which is a continuation of application No. 14/179,171, filed on Feb. 12, 2014, now Pat. No. 9,693,079, which is a division of application No. 13/000,909, filed as application No. PCT/US2010/048974 on Sep. 15, 2010, now Pat. No. 8,681,680.

(60) Provisional application No. 61/242,456, filed on Sep. 15, 2009, provisional application No. 61/242,444, filed on Sep. 15, 2009.

(51) Int. Cl.

| | |
|---|---|
| ***H04L 47/2425*** | (2022.01) |
| ***H04L 67/1014*** | (2022.01) |
| ***H04L 67/1021*** | (2022.01) |
| ***H04L 67/303*** | (2022.01) |
| ***H04N 7/173*** | (2011.01) |
| ***H04N 21/2343*** | (2011.01) |
| ***H04N 21/2365*** | (2011.01) |
| ***H04N 21/2368*** | (2011.01) |
| ***H04N 21/2389*** | (2011.01) |
| ***H04N 21/24*** | (2011.01) |
| ***H04N 21/258*** | (2011.01) |
| ***H04N 21/266*** | (2011.01) |
| ***H04N 21/435*** | (2011.01) |
| ***H04N 21/45*** | (2011.01) |
| ***H04N 21/472*** | (2011.01) |
| ***H04N 21/643*** | (2011.01) |
| ***H04N 21/647*** | (2011.01) |
| *H04H 60/44* | (2008.01) |

(52) U.S. Cl.
CPC ....... *H04N 21/4524* (2013.01); *H04N 21/472* (2013.01); *H04N 21/643* (2013.01); *H04N 21/64723* (2013.01); *H04H 60/44* (2013.01)

(56) References Cited

U.S. PATENT DOCUMENTS

| | | | |
|---|---|---|---|
| 7,567,671 | B2 | 7/2009 | Gupte |
| 7,653,687 | B2 | 1/2010 | Reisman |
| 7,747,720 | B2 | 6/2010 | Toebes et al. |
| 8,060,631 | B2 | 11/2011 | Collart et al. |
| 8,146,157 | B2 | 3/2012 | Meier et al. |
| 8,219,134 | B2 | 7/2012 | Maharajh et al. |
| 8,234,301 | B2 | 7/2012 | Kii et al. |
| 8,352,627 | B1 | 1/2013 | Mackie |
| 8,527,639 | B1 | 9/2013 | Liskov et al. |
| 8,548,946 | B2 | 10/2013 | Hughes, Jr. |
| 8,681,680 | B2 | 3/2014 | Mao et al. |
| 9,113,211 | B1 | 8/2015 | Hanks |
| 9,197,559 | B1 | 11/2015 | Cloonan et al. |
| 9,456,226 | B2 | 9/2016 | Mao et al. |
| 9,609,364 | B2 | 3/2017 | Mao et al. |
| 9,693,079 | B2 | 6/2017 | Salinger et al. |
| 10,327,012 | B2 | 6/2019 | Salinger et al. |
| 10,582,226 | B2 | 3/2020 | Mao et al. |
| 10,856,014 | B2 | 12/2020 | Salinger et al. |
| 2002/0091760 | A1 | 7/2002 | Rozen |
| 2003/0028890 | A1 | 2/2003 | Swart et al. |
| 2003/0236895 | A1 | 12/2003 | Ohkubo et al. |
| 2004/0054786 | A1 | 3/2004 | Kjellberg et al. |
| 2004/0205221 | A1 | 10/2004 | Yamanaka et al. |
| 2004/0249768 | A1 | 12/2004 | Kontio et al. |
| 2005/0010963 | A1 | 1/2005 | Zeng et al. |
| 2005/0188048 | A1 | 8/2005 | Yuan et al. |
| 2006/0259926 | A1 | 11/2006 | Scheelke et al. |
| 2007/0124201 | A1 | 5/2007 | Hu et al. |
| 2007/0140107 | A1 | 6/2007 | Eckert et al. |
| 2007/0147411 | A1 | 6/2007 | Bijwaard et al. |
| 2007/0153825 | A1 | 7/2007 | Cho et al. |
| 2007/0168523 | A1 | 7/2007 | Jiang et al. |
| 2007/0183441 | A1 | 8/2007 | Medin |
| 2007/0220573 | A1 | 9/2007 | Chiussi et al. |
| 2007/0232221 | A1 | 10/2007 | Miyata |
| 2007/0282959 | A1* | 12/2007 | Stern ...................... G06Q 30/02 709/206 |
| 2007/0294733 | A1 | 12/2007 | Aaron et al. |
| 2007/0298708 | A1 | 12/2007 | Maggenti et al. |
| 2008/0140850 | A1 | 6/2008 | Gade et al. |
| 2008/0141317 | A1 | 6/2008 | Radloff et al. |
| 2008/0151807 | A1 | 6/2008 | Meier et al. |
| 2008/0160956 | A1 | 7/2008 | Jackson et al. |
| 2008/0279100 | A1 | 11/2008 | Yuan et al. |
| 2009/0077254 | A1 | 3/2009 | Darcie et al. |
| 2009/0083279 | A1* | 3/2009 | Hasek .............. H04N 21/21815 |
| 2009/0106792 | A1 | 4/2009 | Kan et al. |
| 2009/0168679 | A1 | 7/2009 | Benjamim et al. |
| 2009/0190474 | A1 | 7/2009 | Gahm et al. |
| 2009/0196516 | A1* | 8/2009 | Perlman ................ H04L 65/611 714/752 |
| 2009/0207866 | A1* | 8/2009 | Cholas ............. H04N 21/23655 370/505 |
| 2009/0222520 | A1* | 9/2009 | Sloo ................... H04N 21/6581 709/205 |
| 2009/0248886 | A1 | 10/2009 | Tan et al. |
| 2009/0307307 | A1 | 12/2009 | Garashi |
| 2009/0307758 | A1 | 12/2009 | Lindsley et al. |
| 2010/0017824 | A1 | 1/2010 | Malik |
| 2010/0043067 | A1 | 2/2010 | Varadhan et al. |
| 2010/0077440 | A1* | 3/2010 | Medina ................ H04N 21/658 725/116 |
| 2010/0095012 | A1 | 4/2010 | Zuckerman et al. |
| 2010/0118754 | A1 | 5/2010 | Burton et al. |
| 2010/0153573 | A1 | 6/2010 | Huang |
| 2010/0223240 | A1 | 9/2010 | Cooper |
| 2010/0239086 | A1 | 9/2010 | Johnston et al. |
| 2010/0312857 | A1 | 12/2010 | Ehlers |
| 2011/0013551 | A1 | 1/2011 | Shiroko et al. |
| 2011/0051646 | A1 | 3/2011 | Rice |
| 2011/0058675 | A1* | 3/2011 | Brueck ................... H04L 9/083 709/229 |
| 2011/0064079 | A1 | 3/2011 | Lim et al. |
| 2011/0083153 | A1 | 4/2011 | Cedervall et al. |
| 2011/0119703 | A1 | 5/2011 | Schlack et al. |
| 2011/0141218 | A1 | 6/2011 | Stancato |
| 2011/0202965 | A1 | 8/2011 | Henry et al. |
| 2011/0209025 | A1* | 8/2011 | Takahashi ............. H04L 65/611 714/752 |
| 2011/0252082 | A1* | 10/2011 | Cobb .................... H04L 67/303 709/203 |
| 2011/0252100 | A1* | 10/2011 | Raciborski ............ G06F 16/182 709/217 |
| 2011/0252115 | A1 | 10/2011 | Karlsson et al. |
| 2012/0233644 | A1 | 9/2012 | Rao |
| 2013/0007226 | A1 | 1/2013 | White et al. |
| 2013/0024582 | A1 | 1/2013 | Rodrigues |
| 2013/0051300 | A1 | 2/2013 | He et al. |
| 2013/0094536 | A1 | 4/2013 | Hui et al. |
| 2013/0102253 | A1 | 4/2013 | Marsh et al. |
| 2013/0163444 | A1 | 6/2013 | Tee et al. |
| 2013/0268577 | A1 | 10/2013 | Oyman |
| 2013/0301424 | A1 | 11/2013 | Kotecha et al. |
| 2014/0092818 | A1 | 4/2014 | Yen |
| 2014/0177504 | A1 | 6/2014 | Sayeed et al. |
| 2014/0189052 | A1 | 7/2014 | Gholmieh et al. |
| 2014/0269437 | A1 | 9/2014 | Kotecha et al. |
| 2014/0281011 | A1 | 9/2014 | Zarom |
| 2014/0282777 | A1 | 9/2014 | Gonder et al. |
| 2015/0189394 | A1 | 7/2015 | French et al. |
| 2015/0195328 | A1 | 7/2015 | Rehan et al. |
| 2015/0365885 | A1 | 12/2015 | Yang et al. |

(56) References Cited

U.S. PATENT DOCUMENTS

FOREIGN PATENT DOCUMENTS

| | | | |
|---|---|---|---|
| WO | 2002/017213 | A2 | 2/2002 |
| WO | 2004/029771 | A2 | 4/2004 |
| WO | 2014004787 | A1 | 1/2014 |
| WO | 2016042385 | A1 | 3/2016 |

OTHER PUBLICATIONS

International Search Report for PCT/US2010/48975, mailed Nov. 3, 2010.

Extended European Search Report—EP Application 10817786.6—Dated Feb. 4, 2015.

Partial Supplementary European Search Report—EP Application 10817785.8—Dated Feb. 19, 2015.

Rakesh Mohan et al. "Adapting Multimedia Internet Content for Universal Access." IEEE Transactions on Multimedia, IEEE Service Center, Piscataway, NJ, US. Mar. 1, 1999.

European Search Report—EP App. 10817785.8—mailed Jun. 25, 2015.

European Supplementary Search Report—EP 10817785.8—dated Jul. 14, 2015.

Response to European Office Action—EP 10817786.6—Dated Aug. 19, 2015.

Response to European Search Report—EP Appl. 10817785.8—submitted to Jan. 21, 2016.

European Office Action—EP App 10817786.6—mailed Mar. 9, 2016.

Ahmad, I et al.—"Video Transcoding: An Overview of Various Techniques and Research Issues"—IEEE Transactions on Multimedia—IEEE Service Center—Piscataway, NJ, US—Oct. 1, 2005.

European Office Action—EP App No. 10817785.8—dated Aug. 30, 2016.

Canadian Office Action—CA App. 2,774,480—Dated Oct. 3, 2016.

Canadian Office Action—CA App 2,774,363—Dated Sep. 27, 2016.

Aug. 30, 2017—Canadian Office Action—CA 2,774,363.

Sep. 25, 2017—Canadian Office Action—CA 2,774,480.

Wu et al.—"Segment-Based Proxy Caching of Multimedia Streams"—May 2001—Hong Kong.

Mathais Wien, et al.—"Real-Time System for Adaptive Video Streaming Based on SVC"—IEEE Transactions on Circuits and Systems for Video Technology—Sep. 2007.

Nov. 17, 2017—European Office Action—EP 10817785.8.

Nov. 15, 2017—European Consultation—EP 10817786.6.

Jan. 4, 2018—European Office Action—EP 10817786.6.

Aug. 15, 2018—Canadian Office Action—CA 2,774,363.

Aug. 23, 2018—Canadian Office Action—CA 2,774,480.

Aug. 22, 2019—Canadian Office Action—CA 2,774,480.

Apr. 20, 2020—Canadian Office Action—CA 2,774,480.

U.S. Appl. No. 14/681,619, filed Apr. 8, 2015.

Jul. 8, 2021—Canadian Office Action.

* cited by examiner

CONTROL PLANE ARCHITECTURE FOR MULTICAST CACHE-FILL

CROSS-REFERENCE TO RELATED APPLICATIONS

The present application is a continuation of U.S. application Ser. No. 16/396,960, entitled "Control Plane Architecture for Multicast Cache-Fill," filed Apr. 29, 2019, which claims priority to U.S. application Ser. No. 15/604,110, entitled "Control Plane Architecture for Multicast Cache-Fill," filed May 24, 2017 and patented as U.S. Pat. No. 10,327,012 on Jun. 18, 2019, which claims priority to U.S. application Ser. No. 14/179,171, entitled "Control Plane Architecture for Multicast Cache-Fill," filed Feb. 12, 2014 and patented as U.S. Pat. No. 9,693,079 on Jun. 27, 2017, which claims priority to U.S. application Ser. No. 13/000,909, entitled "Control Plane Architecture for Multicast Cache-Fill," filed Dec. 22, 2010 and patented as U.S. Pat. No. 8,681,680 on Mar. 25, 2014 as a U.S. national stage of PCT/US10/48974, filed Sep. 15, 2010, which claims priority to U.S. Provisional Application No. 61/242,444, entitled "IP Video Service Delivery Reference Architecture," filed Sep. 15, 2009, and to U.S. Provisional Application No. 61/242,456, entitled "TV Anywhere Architecture," filed Sep. 15, 2009, the contents of which are hereby incorporated by reference as non-limiting example embodiments.

BACKGROUND

Consumption of video content used to be a rather straightforward affair. Local television broadcasters transmitted signals over the airwaves, and televisions with antennas tuned them for display. As advances in technology came, similar advances in demand came. Community access television (CATV) expanded the reach of television into more rural areas, and Internet technology increased the demand for transmission of data and other content, in addition to video content. Development of new types of consumption devices, such as mobile telephones, mobile televisions and personal computers, increased the complexity of any system hoping to support those different types of devices. As we become more and more connected, our demand for data steadily increases, placing an increased strain on the information delivery infrastructure. There will always be an ever-present need for improved data transmission efficiency, and increased bandwidth.

SUMMARY

The features described herein generally relate to using transmission bandwidth and increasing its efficiency. In one example embodiment, a termination system can offer both multicast and unicast transmissions to receiving gateway devices. Unicast transmissions can generally be used to provide requested content, while multicast transmissions can be used to carry the more popular content, thereby relieving some of the demand on the unicast bandwidth. A multicast server can identify multiple different versions of a particular piece of multimedia content, and can transmit a multicast list to its gateway devices, announcing the available multicast streams.

The multicast lists supported by a particular termination system can vary. It can vary based on geography, anticipated and actual demand for both the content title itself and its particular versions (which can be device specific). The multicast list can be updated, periodically and, in some cases, incrementally, to provide gateways with current listings of multicast offerings.

The multicast lists can be filtered prior to delivery, so that a particular gateway is only informed of the multicast streams that may be of interest or use to the gateway. For example, filtering can be based on devices known to be supported by the gateway, or on use preferences of the users of the gateway.

The gateway itself can use the multicast list to process requests from the various consuming devices it supports. A device may request a unicast delivery of a piece of content, but the gateway can first consult the multicast list before determining whether to honor the unicast request. The gateway can determine that the requested offering is available in a multicast group stream, and instead of establishing the requested unicast session, the gateway can subscribe to the multicast group, and supply the received content to the consuming device. The content can be packaged in the same way that it would had it arrived in a unicast stream, so the consuming device need not even know its request was not honored as exactly requested.

In some instances, the gateway may determine that a particular version of requested content is not available for multicast, and suggest a hint to the consuming device that offers an alternative version that happens to be available in a multicast stream. By convincing the consuming device to use the multicast version instead, the gateway can avoid the need for creating an additional unicast stream, further alleviating bandwidth demand.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
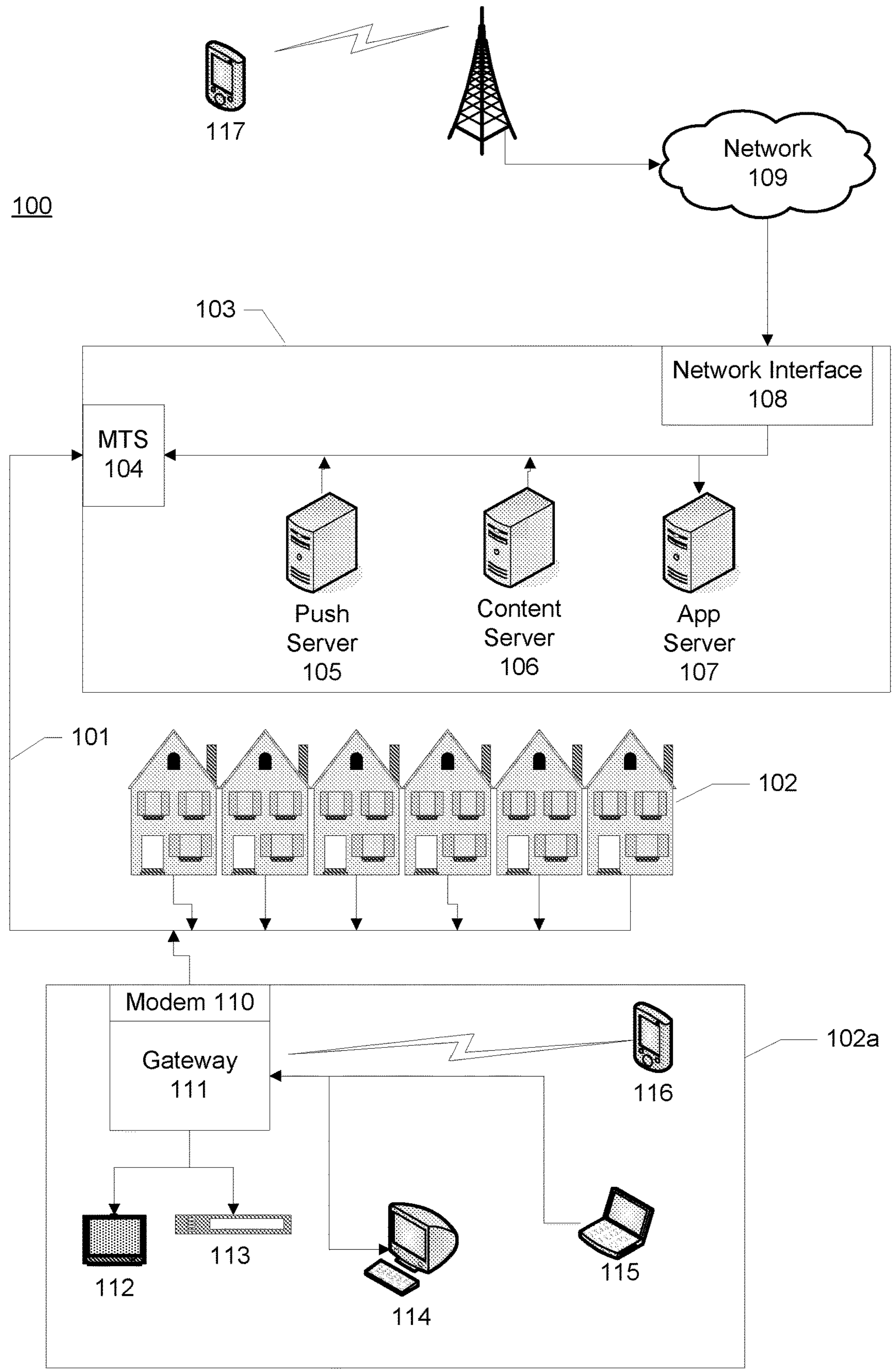
FIG. 1 illustrates an example communication network on which various features of the disclosure may be implemented.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office 103 (e.g., a headend, a processing facility, etc.). The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The various premises 102 may be connected (through wiring and/or wireless connections) to one another, forming a local premises access network operationally distinct from another local access network. The connected homes forming a local premises access network may be located near one another, such as neighboring townhomes, individual apartments in a downtown highrise, or the like. For example, a local premises access network may include the various premises 102. Another group of homes (not shown) may form a separate local premises access network. The local premises access network of the various premises 102 may be identifiable from the separate local premises access network. A local premises access network may also be associated with a particular geographic region (e.g., city, county, geographic area, etc.). In some embodiments, homes connected to a termination system (TS), such as a modem termination system (MTS), may form a local premises access network.

The central office 103 may include a termination system (TS) 104, such as a cable modem termination system (CMTS) in an example of an HFC-type network, which may be a computing device configured to manage communications between devices on the network of lines 101 and backend devices such as servers 105-107 (to be discussed further below). In the example of an HFC-type network, the MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in the homes. This content may be, for example, video on demand movies, television programs, songs, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTMLS, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102*a* may include a modem 110 (or another receiver and/or transmitter device suitable for a particular network), which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
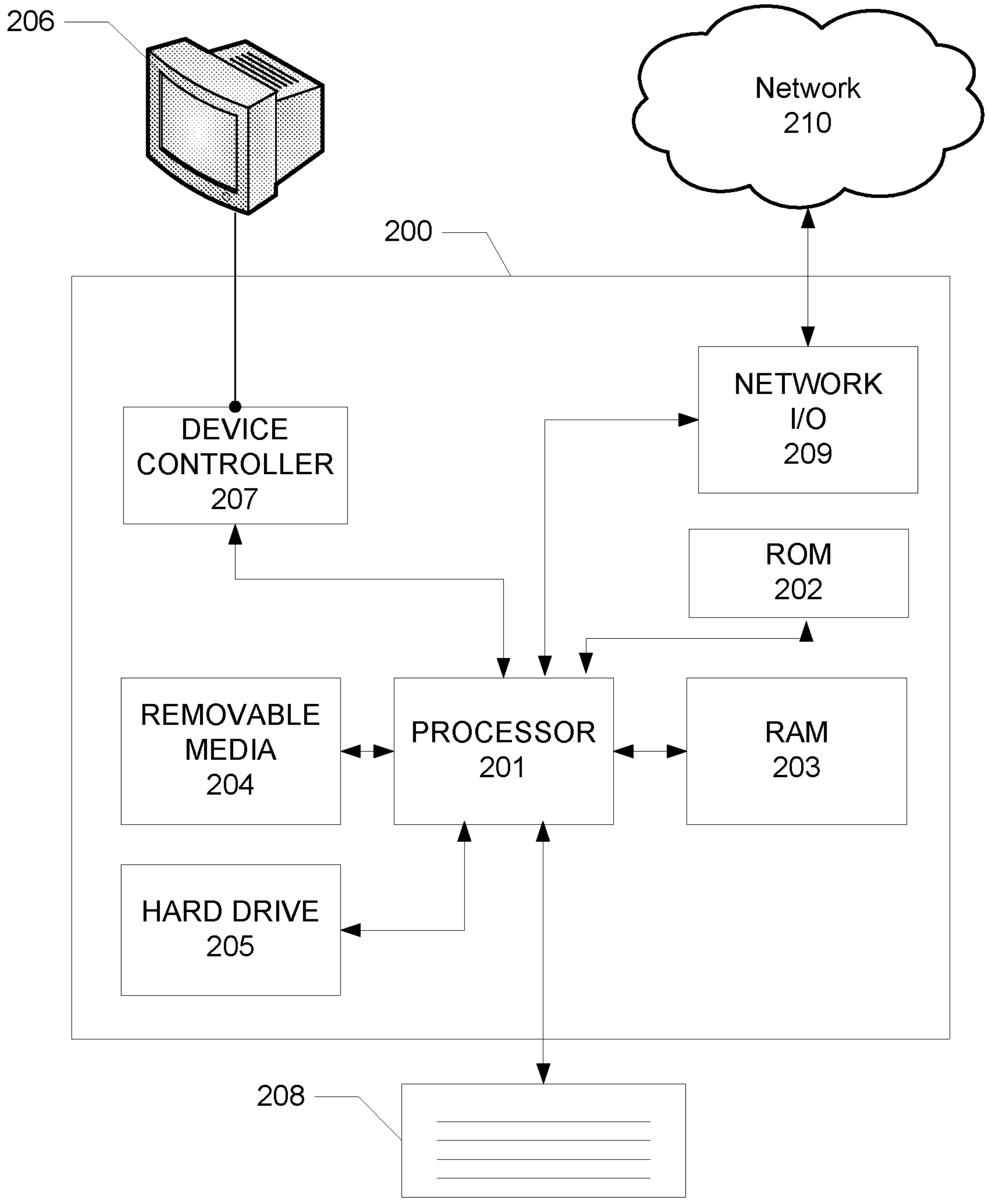
FIG. 2 illustrates an example hardware architecture that can be used to implement any of the various features of the disclosure.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As discussed above, the central office of an information distribution or access network may transmit information downstream to various user devices. The transmitted information may include content for consumption (e.g., playback, viewing, listening, display, storage, etc.) by a user via user equipment, such as a gateway interface device (e.g., gateway interface device 111 of FIG. 1) and/or other computing device (e.g., televisions 112, additional STBs 113, personal computers 114, laptop computers 115, wireless devices 116 of FIG. 1). To assist in providing the content to a user, a content provider may implement in their distribution network an information distribution management system that includes one or more information distribution management devices (e.g., one or more servers and/or other devices) configured to perform various processes related to managing the providing of content to the user equipment (e.g., user device).

For example, such managing may include requesting, creating and handling various sessions (e.g., user sessions, multicast group sessions, cache fill sessions, quality of service sessions); managing transmission of the content (e.g., managing the establishing of transmissions providing unicast content, such as on demand, and linear content, such as multicast content); monitoring usage data of the distribution network, and/or handling requests and notifications from user equipment. As another example, managing may include managing the content discovery, content locating and content delivery processes of the distribution network. In some embodiments, the managing may be implemented using IP (Internet Protocol) and/or HTTP (Hypertext Transfer Protocol) based processes. For example, communication between various devices may be performed using HTTP and/or IP packets. In one example, a session manager server may locate a streaming server and/or a multicast address for a particular content item, and may notify user equipment of the streaming server and/or multicast address for the particular content item using HTTP or IP packets. The user equipment may receive the particular content item (via, for example, a unicast signal and/or a multicast signal) by receiving HTTP packets that include fragments of the content item and metadata identifying the streaming server and/or multicast address. In some embodiments, communication between devices may use only a single protocol (e.g., only HTTP packets or IP packets). Content items may also be transmitted using the single protocol (e.g., HTTP packets including fragments of content items). Details of these processes, and others, will be discussed in further detail below.

Content discovery processes may include supporting the discovery of content for various content items being provided by or available on a distribution network. For example, content discovery processes may support the discovery of content items for multicast, linear, or other type of transmission. In some embodiments, content discovery and the various related processes may use an HTTP-based approach (e.g., communication is via HTTP and/or IP packets) that includes communication between user equipment, application servers, and other various servers of the network.

Content locating processes may include supporting the setup of various sessions and managing the resources of the information distribution network. In some embodiments, content locating processes may enforce entitlement procedures and digital rights management (DRM) licenses. Additionally, in some embodiments, content locating and the various related processes may use an HTTP based approach that includes communication between user equipment, session manager servers, and other servers in and out of the network.

Content delivery processes may include supporting the streaming of the content items from various servers, such as a streaming server of the central office. In some embodiments, content delivery processes may enable user equipment to receive multicast signals (e.g., signals directed at a plurality and/or group of user equipment) and/or receive unicast signals (e.g., signals directed at a specific user device). Additionally, in some embodiments, content streaming and the various related processes may use an HTTP or IP based approach that includes communication between user equipment, content servers, and other servers of the central office.

Figure 3:
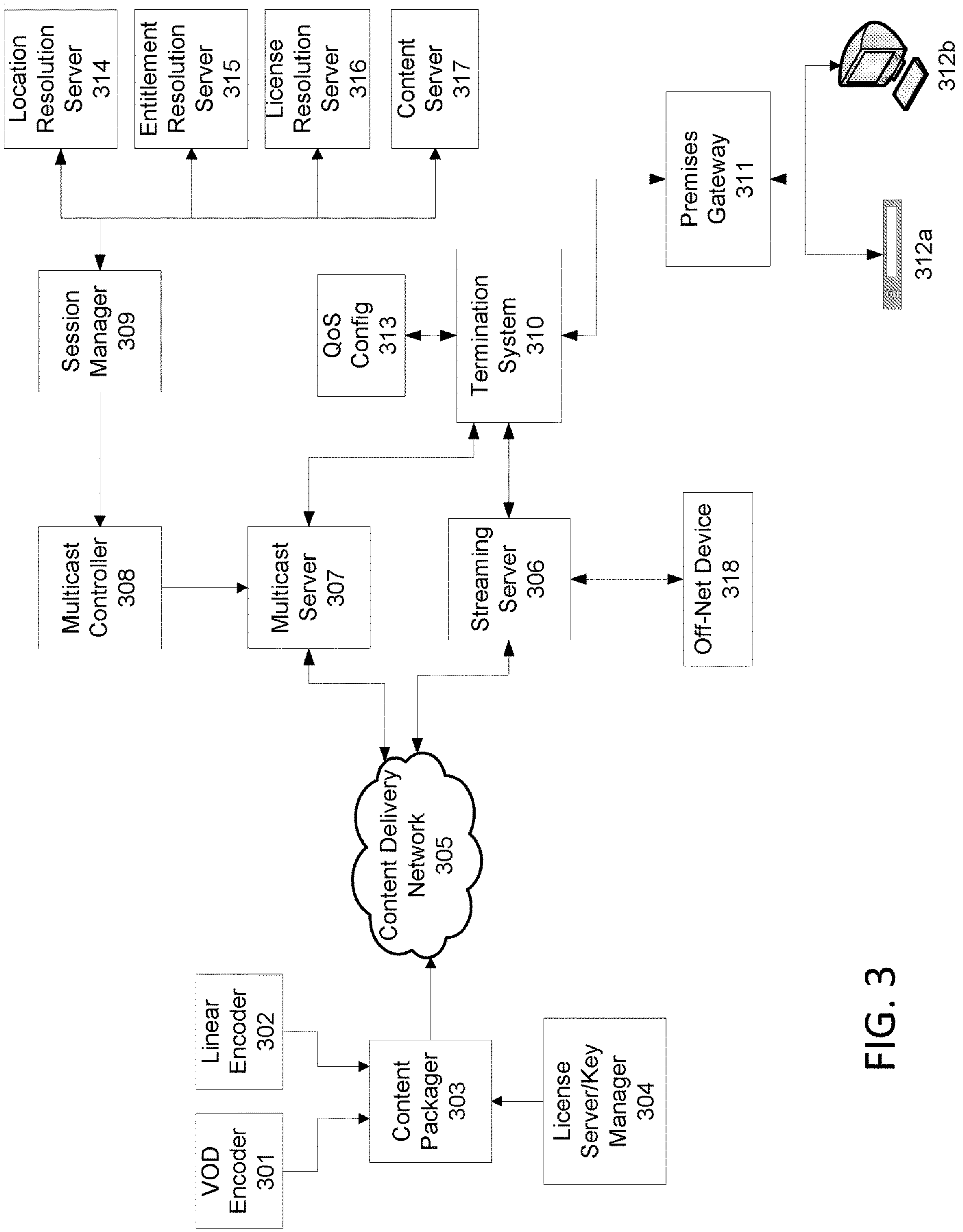
FIG. 3 illustrates another view of a communication network on which various features of the disclosure may be implemented.

FIG. 3 illustrates an example system of components that may be implemented on the network 100, and which may be used to implement various features described herein to supply various content to users. The system may include one or more sources of the content. For example, in the case of video content (e.g., audio video content), there may be one or more video on demand (VOD) content encoders 301, each of which may include an application server (such as application server 107) configured to store video content such as movies, television shows, video clips, musical videos, etc. The VOD content encoders 301 may include encoding hardware and/or software to provide content in a desired format, such as MPEG.

The system may also include one or more linear content encoders 302. Linear content encoders 302 may be similar to VOD content encoders 301, but may further be configured to supply content according to a predetermined schedule, as opposed to on demand. For example, the NBC content service may have one or more linear encoders 302 configured to supply a video stream of NBC scheduled video programming (e.g., the nightly news) at the appropriate time.

The system may include one or more content packagers 303. The content packager 303 may be another application server, but configured to receive content and package it for delivery to users. This packaging may include, for example, reformatting the content (e.g., video resolution conversion, coder/decoder conversion, audio conversion, compression altering, synchronizing, etc.), encrypting the content, and segmenting the content (e.g., a two-hour movie may be divided into a plurality of discrete time segments for delivery).

The system may include a license server/key manager 304, which may be a server configured to manage content entitlement. For example, the license server/key manager 304 may contain encryption and/or decryption keys, and can supply those keys to content packager 303 for use in encrypting content for delivery. The license server/key manager 304 may also store information identifying users, and the level(s) of service to which the users are entitled, and may make determinations as to whether a particular user is actually entitled to receive a piece of requested content.

Content delivery network 305 may be any desired type of communication network, such as network 109. The content delivery network 305 may span a large geographic area, and may be used to disseminate content or make content accessible. For example, some content may be supplied to a streaming server 306. The streaming server 306 may be a server configured to receive packaged content, and generate a unicast stream of that content for delivery to a user.

Another example may be a multicast server 307. Like the streaming server, multicast server 307 may also be configured to generate a stream of packaged content. However, the multicast server's stream may be a multicast stream, configured to be received by a plurality of recipient users.

The multicast server 307 may operate at the direction of a multicast controller 308, which may in turn communicate with a session manager 309 to establish multicast sessions for the delivery of various pieces of content. Session Manager 309 may be configured to manage one or more sessions of the distribution network by interfacing with various devices in the distribution network and communicating session information with the various devices. In some embodiments, the sessions that are managed by session manager 309 may include a user session, a multicast group session, a cache fill session, and/or a QoS flow session. For example, a user session may be created upon a user device requesting content, and may include information related to the requested content and the entitlements of the user device. A multicast group session may be created upon a user device joining a multicast group of a particular group of user equipment, and may include information related to the multicast group. A cache fill session may be created upon a user device requesting a cache fill of a particular content item being transmitted (e.g., multicast or unicast), and may include information related to the user device and the particular content item. A QoS flow session may be created based on the initiation of a transmission to a user device, and may include information related to the QoS profile being enforced and the user device. Details of these sessions will be discussed in further detail below.

The servers 306/307 may communicate with a termination system 310 (e.g., termination system 104) to ultimately deliver the content to a user's premises, or to a premises gateway 311 that can, in turn, supply content to various pieces of user equipment, such as a set-top box 312*a*, computer 312*b*, or any other desired display device piece of user equipment.

Other servers may be used as part of this delivery as well. For example, a quality of service (QoS) configuration manager 313 may be used to determine quality of service parameters for a given stream. As another example, a location resolution server 314 may contain geographic identification information for the various servers 306/307, termination system 310, content packagers 303, and other components in the system, and may be configured to determine which device(s) are closest geographically to a requesting user device. Location resolution server 314 may be configured to determine location information for a particular user device. For example, in some embodiments, location resolution server 314 may receive a location request identifying a particular user device, determine geographic information (e.g., latitude and longitude) for the user device, determine whether the user device is on-network or off-network, and transmit the information to the session manager 309. A user device being on-network may include user devices connected via termination systems (e.g., termination system 310) of the content provider. A user device being off-network may include user devices (e.g., user equipment connected via third party distribution networks) that are not under the management or control of the session manager 309 and multicast controller 308.

An entitlement resolution server 315 may be configured to validate a user device's entitlement to a particular content item. For example, in some embodiments, entitlement resolution server 315 may receive a validate entitlement request identifying a content item; determine whether a user device has a valid entitlement to the content item, based on user session information, content item information, and location information of the user device; and transmit the information indicating the result of the determination to the session manager 309. Entitlements resolution server 315 may also be configured to validate a user device's license to a particular content item. For example, in some arrangements, entitlement resolution server 315 may receive a validate license request identifying a content item, determine whether a user device has a valid license to the content item, based on user session information and content item information, and transmit information indicating the result of the determination to a license resolution server 316.

License resolution server 316 may be configured to distribute licenses and/or distribute decryption and encryption keys. For example, in some embodiments, license resolution server 316 may distribute encryption keys to content packager 303 or to license server/key manager 304. The license resolution server 316 may also receive a license request from a user device; transmit a request to the entitlement resolution server 315 to validate the license; and upon receiving an indication that the user device has a valid license, and transmit the license and one or more decryption keys to the user device.

A content server 317 may also be provided. The content server 317 may be one or more computing devices that are configured to resolve requests for content. This content may be, for example, video on demand movies, television programs, songs, text listings, etc. In some embodiments, the content server 317 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The system may also include one or more off-net devices 318. As noted above, an off-net device 318 may be similar to the gateway 311, but can be a device connected to a third party network that may be part of a different network from the one of the termination system 310. For example, if the termination system 310 is a land-based fiber optic and/or coaxial cable network, the off-net device 318 may be a wireless cellular or satellite network. Aside from the fact that the off-net device 318 may be part of a different network from the on-net devices (e.g., gateway 311), the off-net device 318 may behave in a similar manner as described herein for the gateway 311.

Figure 4:
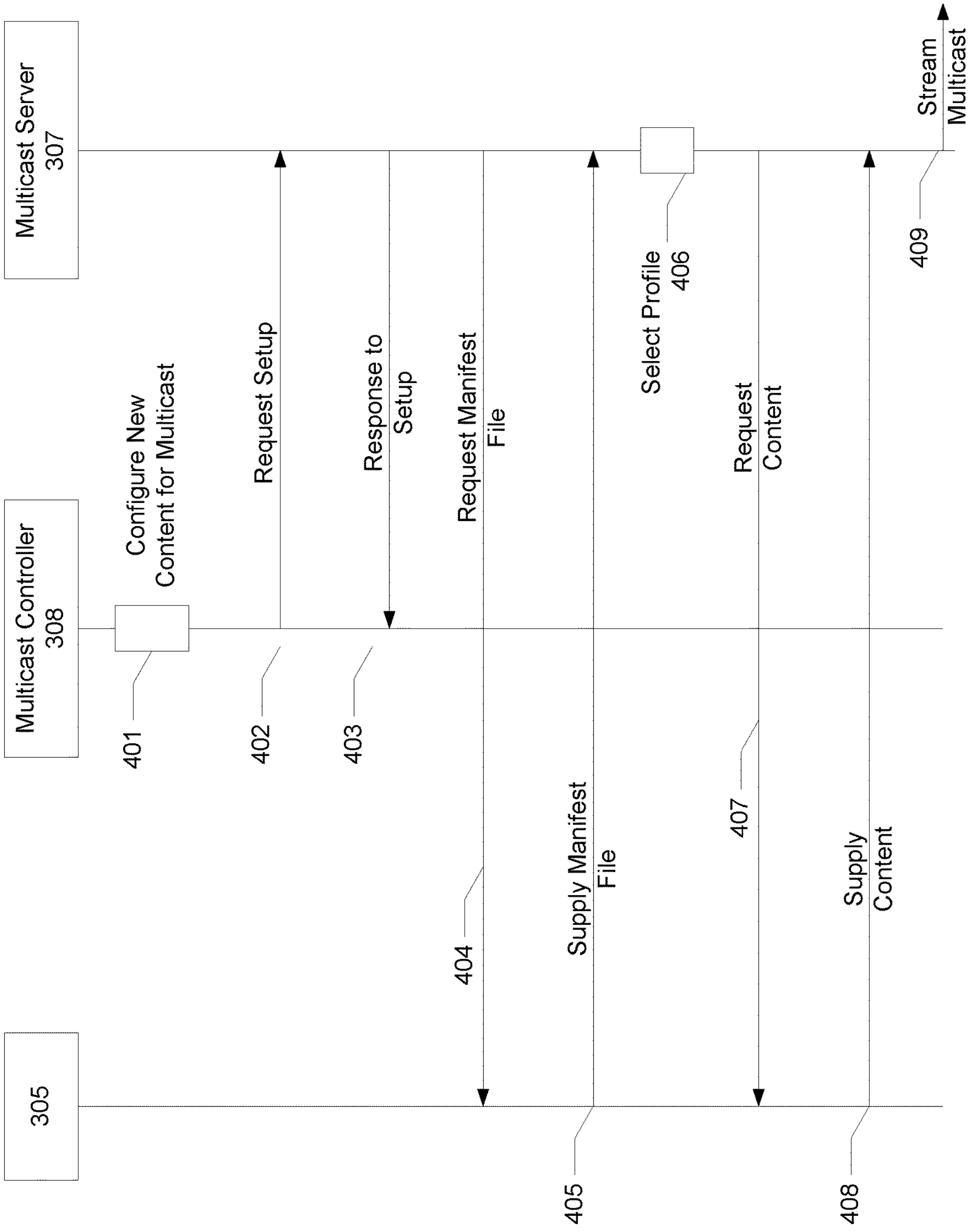
FIGS. 4-9 illustrate signaling and process flows for handling various aspects of multicast sessions.

FIG. 4 illustrates an example signaling flow diagram for setting up a multicast server 307's multicast feed. The multicast server 307 may be configured to continuously transmit a plurality of multicast streams (e.g., IP multicast streams) to groups of devices that have subscribed to or joined the multicast streams. The FIG. 4 signaling flow may illustrate one example of how such a stream is established.

In step 401, the multicast controller can determine that a particular piece of content should be multicast, and configure that new piece of content for use in the multicast feed. Determining whether a piece of content should be multicast may depend on a variety of factors to maximize efficient use of the multicast server 307. In some embodiments, the multicast controller 308 (or other device in the network) may monitor actual or anticipated demand for the various items of content in the system (movies, shows, sporting events, television networks, etc.), and use the multicast signal to carry popular content.

In some embodiments, this ranking can take into account different versions of content as well. So, for example, if the high definition version of a popular movie is expected to be highly demanded, but the standard definition version is not, then the ranking can list the high definition version higher than the standard definition one. As another example, the versions can differ based on the end device (CPE) being used to consume the content. If there are a large number of devices having a first configuration (e.g., a large number of mobile telephones having 4-inch touch displays), then the version of content fitting that device can be ranked higher than versions of the content that are configured for other devices (e.g., mobile telephones having smaller displays, or non-touch displays).

In some embodiments, the ranking can be time-based. For example, the controller 308 can define a time interval (e.g., 2 weeks), and can revisit the ranking of content versions periodically according to the time interval.

In some embodiments, the ranking can take into account geography as well. For example, the controller 308 can gather statistical information for the geographic area served by a given termination system 310, and restrict its ranking based on information for that area (e.g., the types of CPEs in that area, the movies that are popular in that area in view of viewer demographics, etc.). If a large number of homes in a given area, e.g., a single ZIP code, happen to have a particular type of CPE (e.g., a brand of mobile television device is popular in that area), then the version of a movie configured for that type of CPE may be ranked higher than versions of the movie set for other devices.

The configuration of the content may include, for example, preparing multiple versions of a piece of content, such as a high definition/resolution version, a standard definition version, different encodings and/or file formats of the same content (e.g., the same television program can be encoded with different video encoder protocols).

This configuration can also include generating a map identifying which termination system servers 310 are used with which multicast servers 307. The various termination systems 310 can be dispersed geographically, each servicing a range of premises and gateways 311, and each termination system can be associated with (or include) a multicast server 307 that is configured to handle multicast streams for the users serviced by its corresponding termination system 310.

In step 402, the multicast controller 308 may transmit a multicast setup request to a multicast server 307. This message may be in the form of an HTTP POST message, and the message body may include a variety of parameters. For example, the message may include a Multicast ID parameter, which is a unique identifier for a particular piece of content.

The message may include a Content Path parameter, which can be an address, such as an IP address or URL, where a piece of content may be found.

The message may include Content Manifest File Name. A content's manifest file may include metadata information to help a multicast server 307 interpret the content file's various profiles. As noted above, each piece of content may be available in a variety of different versions. For example, a movie might be available in a high definition version, a standard definition version, versions having different compression ratios, different encryption types, different required bitrates, etc. Each of those versions may have a profile, identifying a file location for that version, its necessary bitrate, encoder/decoder, resolution, etc., and the manifest file may inform the multicast server 307 as to the formatting of the content's profile. This can be especially useful, for example, where multiple different parties supply different content, and each party uses its own unique formatting for providing profile information.

The manifest file may identify a plurality of profile levels, each level identifying an encryption, compression, or resolution level that is suitable for delivery given a predetermined bitrate. For example, the file may identify two different profile levels, one for high bitrate use and one for low bitrate use, and these levels may identify different types of compression suitable for the available bitrates (e.g., a low bitrate level could use a more lossy level of encryption because the content files would be smaller).

The message may include a List of Profile Levels parameter, which can specify the profiles in the manifest file that the multicast server should deliver. For example, the multicast controller may determine that a particular multicast server should offer 3 versions of a particular video program: one high bitrate version, one medium, and one low bitrate version. The List of Profile Levels parameter may identify these three profile levels to the multicast server. In some embodiments, this parameter is optional, and when the parameter is absent, the multicast server can be automatically configured to deliver the highest bitrate profile contained in the manifest file.

The message may include a Server Multicast Source parameter and a List of Server Multicast Groups parameter. These parameters may identify, for each profile, a corresponding multicast source (e.g., an address of the multicast server 307) and group (e.g., name of a multicast group).

In response to the setup message 402, the multicast server 307 can acknowledge the request by sending a response 403, and then proceed to prepare a multicast stream for the content. This can begin by sending a request for the manifest file in step 404. The request can be an HTTP GET request, and although FIG. 4 illustrates the request being sent to the content delivery network 305, the request can be addressed to any desired location on the content delivery network 305, for example, at a content delivery network (e.g., using an address identified by the Content Manifest File Name parameter discussed above). For example, the manifest file may be located at a content server responsible for the content, such as a server associated with one of the encoders 301/302 discussed above. The request may also identify the manifest file name being requested.

In response, in step 405, the manifest file source may supply the manifest file to the multicast server 307. In step 406, the multicast server may compare parameters, such as the List of Profile Levels parameter, with the available profiles in the manifest file, and select one or more profiles for the one or more versions of the content that the multicast server will make available to users.

Then, in step 407, the multicast server 307 can issue a request to the content source (represented in FIG. 4 as part of the content delivery network 305) for the one or more versions of the content. The request can be another HTTP GET message, and can identify network address parameters for the content source, identify the content itself, and identify the one or more requested profiles. If the content is a fragmented portion of a larger piece of content (e.g., a six-minute portion of a television program), the request in step 407 may identify the segment of the program and, if the program is divided into even smaller fragments, then the request can also identify the specific fragment or all of the segments.

In step 408, the content source supplies the requested content, and in step 409, the multicast server can generate one or more multicast streams (e.g., IP multicast streams) carrying the content. The generation and use of these streams is discussed further below.

Figure 5:
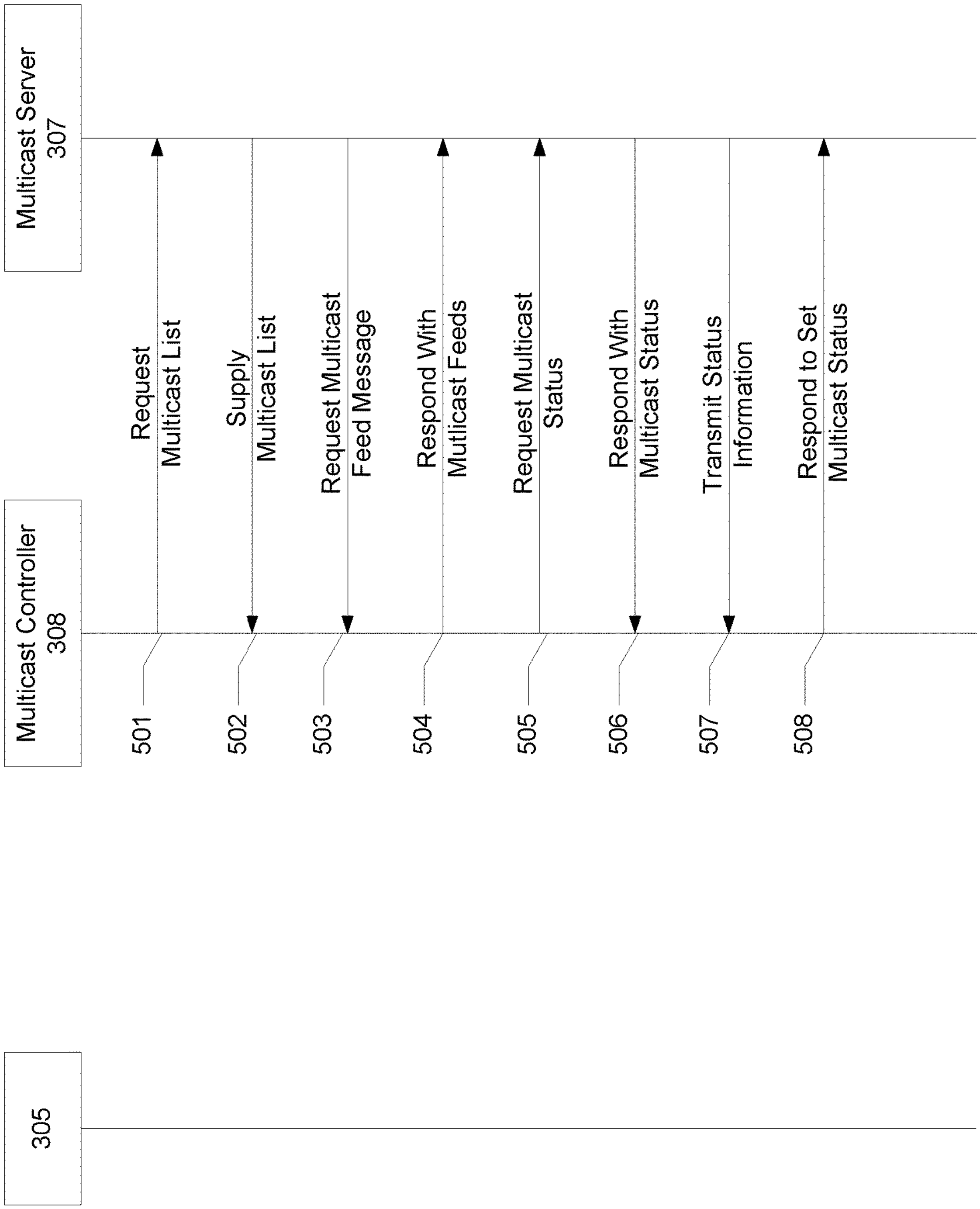

The FIG. 4 signal flow resulted in the multicast server 307 obtaining desired content and making that content available in a variety of multicast feeds. FIG. 5 illustrates a signaling flow for maintaining and monitoring those multicast feeds by the multicast server 307. For example, steps 501-504 illustrate communication sequences to allow a multicast controller 308 and multicast server 307 to remain synchronized, for example, in terms of the groups and profiles that the server 307 is serving. In step 501, the multicast controller 308 can issue a multicast list request to the multicast server 307. This request can be an HTTP GET request, and can include a Multicast Identifier, identifying a desired multicast list (e.g., a listing of multicast streams that the controller is expecting the server 307 to be supplying).

In step 502, the multicast server 307 can respond with a list of the multicast streams that it is currently offering. The response can include, for example, an ID identifying the multicast stream in the response, a Content Path parameter identifying the content itself (e.g., its name, the address of its source, etc.), and a List of Profile Levels parameter listing the profile levels for the content being offered by the multicast server. The response can also include a Server Multicast Source identifying the multicast server 307, and a List of Server Multicast Groups parameter, identifying the one or more multicast groups that contain each profile version of the content. For example, a given version of content may have a single profile, but that version may be offered in multiple multicast groups, so the List of Server Multicast Groups parameter may list those groups.

In step 503, the multicast server 307 may transmit a multicast feed request message to the multicast controller 308. The request may be another HTTP GET message, and may identify the server itself, as well as a Multicast ID listing the multicast streams that the server 307 is currently transmitting.

In response, in step 504, the multicast controller 308 may transmit a response containing a Response Code identifying the type of response (success, failure, etc.), and a List of Multicast Info parameter, which can contain information for one or more multicast groups. The response can identify, for example, the Multicast ID, the Content Path of the content source, the List of Profile Levels for the content that the multicast server 307 is to provide, the Server Multicast Source, and a listing of the Multicast Groups that the multicast server 307 is to support. As noted above, each profile may be associated with multiple multicast groups, so this listing (one per profile) can identify those groups.

Steps 505-508 illustrate a communication sequence that allows the multicast server 307 and controller 308 to exchange status information for the various multicast streams being offered by the server 307. In step 505, the multicast controller 308 can issue a multicast status request to the multicast server 307. The request can be an HTTP GET request, and can include a Multicast ID parameter, identifying one or more multicast streams that the multicast controller 308 wishes to monitor.

In step 506, the multicast server 307 can respond, for example, with a Response Code identifying the success/failure of the request, and a List of Multicast Status value containing information for the one or more requested multicast streams identified in the controller 308's request. This list can identify the Status of a particular multicast stream, such as whether it is active, as well as a Content Bit Rate parameter identifying the bit rate at which the particular content is being delivered in this stream.

Steps 505-506 were initiated by the multicast controller 308. As an alternative, the multicast server 307 can voluntarily report its status information to the controller 308. Steps 507-508 illustrate this, in which the server 307 can transmit (step 507) its status information as an HTTP POST request, and the controller 308 can respond (step 508) with a Response Code to indicate a successful (or failed) delivery of the status information.

Figure 6:
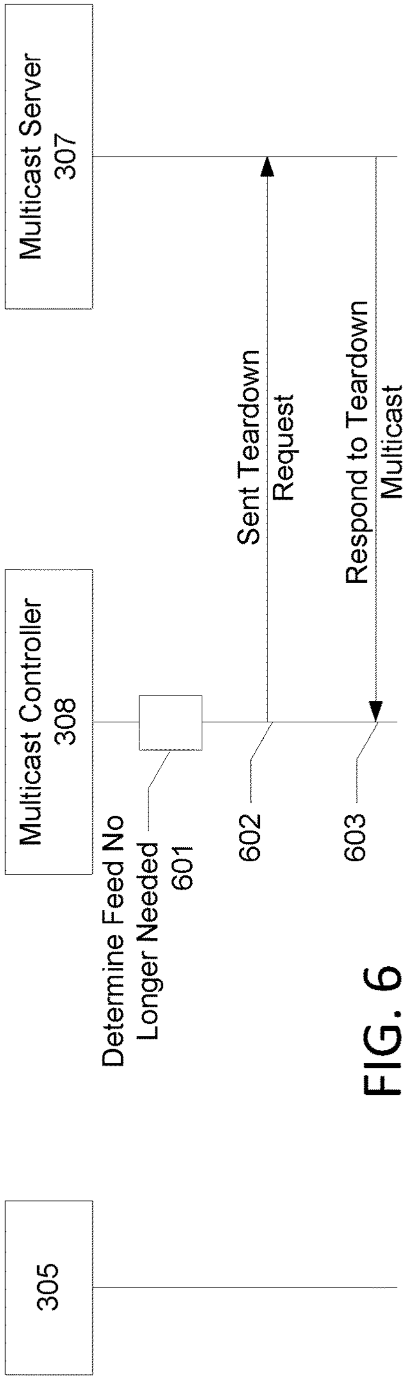

FIG. 6 illustrates an example signal flow for stopping or tearing down a multicast feed when it is no longer desired or needed. First, in step 601, the multicast controller 308 may determine that a particular content item in an existing multicast feed being sent by the multicast server, or the feed itself, no longer needs to be included. This can occur for a variety of reasons. For example, the multicast controller 308 may determine that the number of users who are subscribed or otherwise joined to a particular multicast group has fallen below a predetermined threshold to justify the multicast feed, and that the few remaining users who wish to watch content in the feed would be better served with unicast transmissions instead. For example, the controller 308 may maintain a count of the number of devices that are members of the multicast group for a particular piece of content, and if that membership count falls below a predetermined level (e.g. less than 1000 member devices). In some embodiments, the controller 308 may maintain a demand listing for each available piece of content in the system, and only the top 100 pieces of content (based on number of requests, demand, anticipated demand, etc.) can be sent as multicasts (the other content would be sent as unicast streams upon demand as needed).

In step 602, the multicast controller 308 can send a teardown multicast request to the multicast server 307. This request can be an HTTP POST request, and can contain, for example, a Multicast ID parameter, identifying the multicast feed that is to be terminated. The request can also include a Reason Code parameter, identifying to the multicast server the reason(s) or the teardown. In response, the multicast server 307 can terminate the feed, release resources reserved for the feed, and send a response in step 603 confirming the teardown. The response can contain a Response Code, indicating that the teardown was successful (or if it failed).

Figure 9:
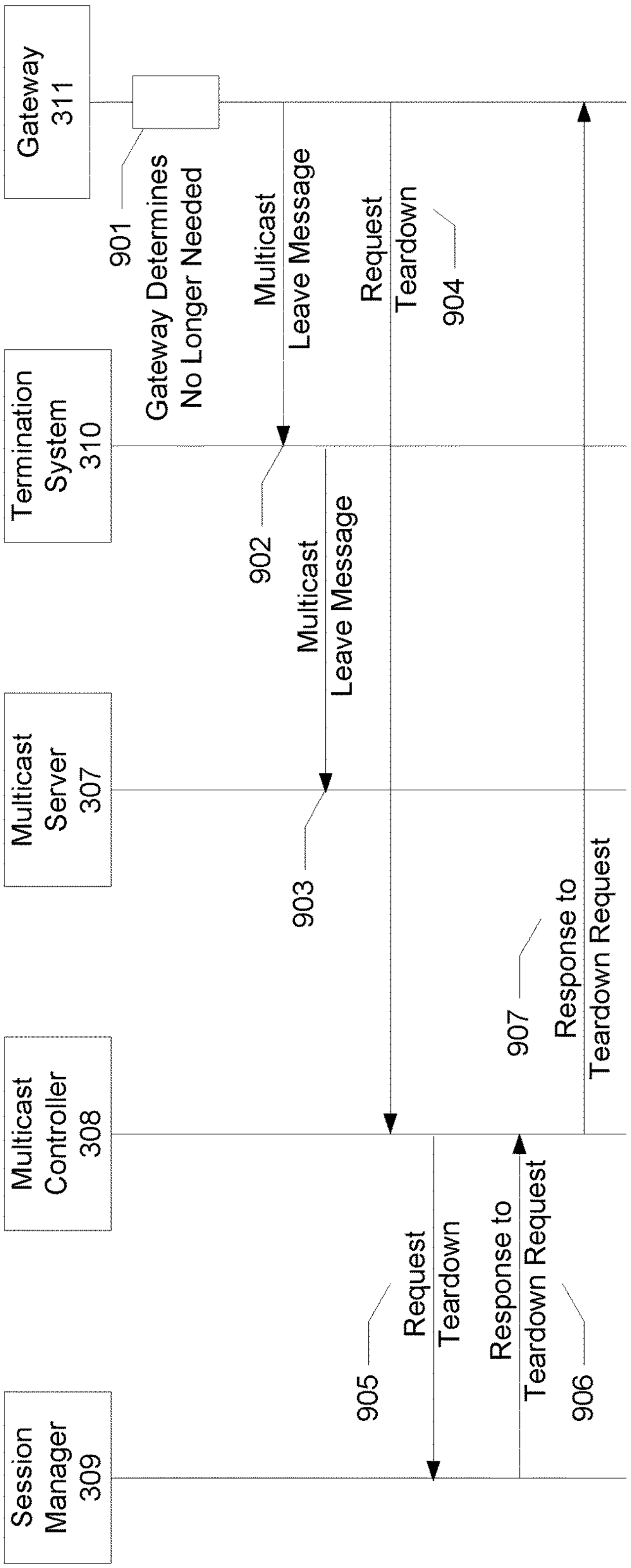
Figure 7:
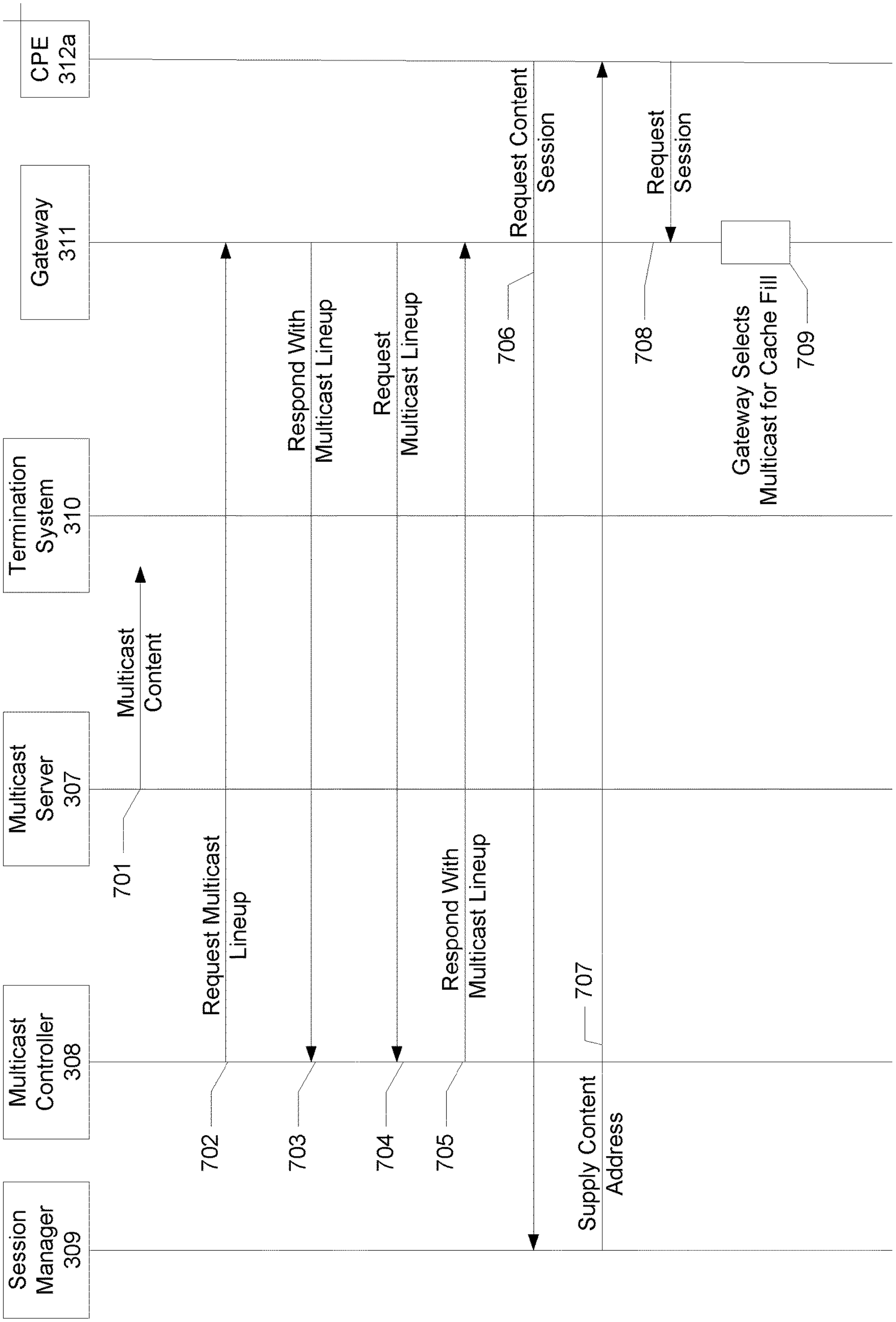
Figure 8:
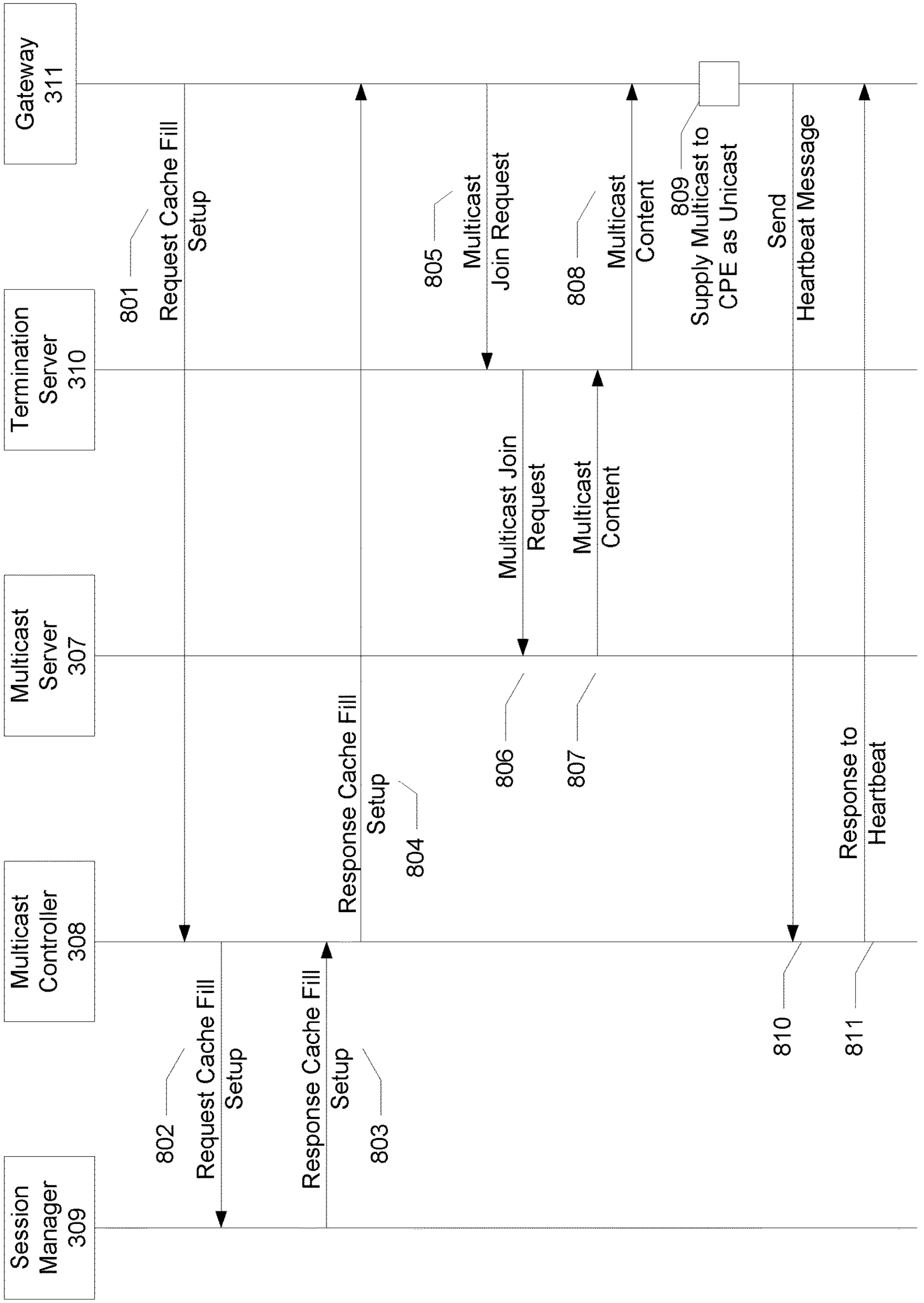

The flows in FIGS. 4-6 have discussed an example of how a multicast feed can be established, monitored and terminated by the multicast server 307 and its controller 308. FIGS. 7-9 will illustrate an example of how a user can discover the existence of the available multicast feeds and use them. FIG. 7 illustrates an example of multicast discovery, in which the user's device, such as gateway device 311, can learn the existence of available multicast feeds.

In step 701, the multicast server 307 can be transmitting one or more multicast feeds (and may continuously do so). These feeds may be IP multicast data streams supplied to one or more termination systems 310 supported by the server 307. Those streams can contain items of content that have been packaged by the content packager 303, for example, and converted to an IP stream. The termination system 310 can use this multicast stream to supply a multicast stream to the various gateways 311 using any desired multicast protocol. For example, the termination system 310 can use a PacketCable Multimedia (PCMM) multicast or Internet Group Multicast Protocol (IGMP). In such a stream, an RF portion of a cable network can be used as a multicast datastream to deliver data to subscribing modems on the network.

In step 702, the multicast controller 308 can transmit a multicast lineup message to a user's home or premises gateway 311 (or in some embodiments, to a termination system 310 serving the gateway 311). This transmission can occur periodically (e.g., daily, every 15 minutes, etc.), or on demand as needed. The lineup message can include a listing of the various multicast streams being supplied in the step 701 multicast transmission. The listing can include, for example, a Content Path parameter (identifying a network address where a piece of content in the stream can be found), and a Profile Name parameter identifying a manifest file profile for the content (as noted above, the profiles may identify characteristics of a version of the content, such as its bitrate, resolution, etc.). The list can include a Server Multicast Source parameter, providing a unique identifier for the multicast server 307 offering the listed multicast stream, and a Server Multicast Group parameter, providing a name for the listed multicast stream.

The lineup supplied to the gateway 311 can be filtered based on a variety of factors. For example, the controller 308 may have previously received configuration information from the gateway 311 identifying the CPE device(s) that are registered with and/or served by the gateway 311. Before sending the lineup in step 702, the controller 308 can edit the lineup to remove entries for content versions that are incompatible with the gateway 311's CPEs (e.g., versions that require larger screens that are in use at the home, or require decoding/decrypting functionality not present in the gateway 311 or its CPEs, etc.). The controller 308 may be aware of the digital rights management capabilities of the various CPEs, and can remove listings for content to which the CPE would not be able to gain access.

The filtering can also remove content that is undesired by the users of the gateway 311. For example, users may inform the gateway 311 (which can inform the controller 308) that the users do not wish to view available content of a certain genre (e.g., sports, adult programs, children's cartoons, etc.), or that certain programs are undesired.

Although the lineup transmission is illustrated once here, the transmission can actually occur periodically. For example, the lineup can be sent every night at a given time. Or, the lineup can be sent piecemeal, such as sending the overall lineup once a day, and sending incremental updates to the lineup more frequently (e.g., every 30 minutes). The incremental updates may simply indicate what changes have occurred to the lineup since the last update.

In step 703, the gateway 311 may send a confirmation, indicating that the lineup message was received (or containing a Response Code identifying whether it was received, or if a failure occurred).

As discussed, steps 702/703 may involve the multicast controller 308 sending a notification to the gateway 311 of the multicast lineup (e.g., listing of multicast streams or groups) that the termination system 310 is supplying. In preparing this list, the multicast controller 308 can consult a stored database mapping the gateway 311 to termination systems 310, to identify the particular termination system 310 that services the gateway 311. The controller 308 can also filter the list of multicast streams to omit streams that are unusable by the gateway 311 or its supported devices (e.g., CPEs behind the gateway). For example, the controller 308 may have previously received a registration listing of the various devices supported by the gateway 311, along with information identifying the devices' characteristics (e.g., their processing capacity, available memory, encryption and digital rights management information, display resolution and size, bandwidth and bitrate, etc.).

Alternatively, or in addition, the gateway 311 can request transmission of the lineup. This can occur, for example, periodically according to a schedule (e.g., once a day), or on demand when a new device signs on with the gateway 311 or when an existing device indicates a change in capability (e.g., addition or removal of application program, physical memory, etc.). Step 704 includes an example multicast lineup request, which can be an HTTP GET request sent from the gateway 311 to the multicast controller 308. The request itself may include a Device Identifier parameter, identifying the gateway 311 and/or a device being serviced by the gateway, indicating that the identified device is requesting the multicast lineup.

In step 705, the multicast controller 308 can assemble the multicast list information, as in step 702. In doing so, the multicast controller 308 can use the Device ID to consult one or more device profiles, to identify multicast streams that are compatible with the requesting device (e.g., display resolution, processing capacity, encryption, etc.).

In step 706, a device (e.g., CPE) serviced by the gateway 311 may send a request directly or via the gateway 311 to a session manager 309, requesting access to a stream or item of content. For example, the device may have previously downloaded a listing of available content from an Internet site, and the user of the device may have clicked on a listed piece of content. In step 706, the request may be a message to the session manager 309, identifying the CPE device and the requested content.

In step 707, the session manager 309 may establish a session for the user (e.g., authenticate that the user is permitted to access the content, determine which version to provide, process payment, etc.), and may respond by supplying the CPE device with an address for the requested content (e.g., a Universal Resource Locator address for a version of the content that the device can handle).

In step 708, the CPE device can send a request to the gateway 311, requesting that the gateway 311 establish a session, such as a unicast session, to receive the content desired by the CPE user. The request may identify the address supplied by the session manager 309.

In step 709, the gateway 311 may determine whether to honor the CPE device's request for a unicast session. In doing so, the gateway 311 may first determine whether the requested content is currently being multicast by the multicast server 307. To do so, the gateway 311 may consult a stored copy of the multicast list obtained in steps 703 or 705, and compare it with the profile information for the content requested by the CPE device. If the requested version of the requested content is already being multicast by the multicast server 307, the gateway 311 can proceed to the FIG. 8 method/signaling flow (discussed below), and join the multicast group. If the requested version of the requested content is not being multicast, then the gateway 311 can proceed with setting up the requested unicast session using the supplied content address. Although the process of FIG. 7 has been described using communications through a gateway 311, all communications may occur directly between CPE device 312 and multicast controller 308 or session manager 309.

FIG. 8 illustrates an example signal flow for establishing a multicast operation, such as a cache fill operation, when one or more of the available multicast streams has been requested by a device supported by the gateway 311. In step 801, the gateway 311 may transmit a cache fill setup request to the multicast controller 308. The setup request may be an HTTP POST request message, and may include a Device ID parameter identifying the gateway 311 (or CPE device) requesting the cache fill, a Content Path parameter identifying the address of the desired content, a Profile Name identifying the profile version of the content to be cached, a Server Multicast Source identifying the multicast server 307, and a Server Multicast Group identifier identifying a multicast group containing the requested content.

In step 802, the multicast controller 308 can transmit a cache fill setup request to the session manager 309. The setup request may be an HTTP POST request message, and may include a Device IP Address for the desired content, a Content Path identifying the location of the content at that address, the Server Multicast Source and Group values in the prior request 801, and additional bitrate information. The bitrate information may identify the average and/or maximum bitrate that the requesting device can receive and/or process (the controller 308 can possess this information in advance through querying or measurement of the device and/or reporting by the device).

In step 803, the session manager 309 can respond with a message, indicating whether the prior message was successfully received, and whether the cache fill setup is successful.

The multicast controller may, in turn, transmit a response 804 back to the home gateway 311. The steps 801-804 cache setup signaling may be omitted, for example, if the multicast session protocol permits multicast session joining without involving the session manager 309.

In step 805, the gateway 311 may transmit a session join message to the termination system 310. That message, which can be an Internet Group Management Protocol (IGMP) Join message, can identify the Multicast Server Source and Group to be joined. IGMP may be used to support multicast transmission between the termination system 310 and a gateway 311. Additionally, the multicast session from the multicast server 307 to the termination system may follow a different standard, such as the PacketCable Multimedia (PCMM) standard.

The termination system 310 can, in turn at step 806, transmit a server multicast join message to the multicast server 307, identifying the same Multicast Server Source and Group. In steps 807-808, the multicast server 307 can begin to transmit the multicast content to the termination system 310, which in turn transmits it to the gateway 311. The gateway 311 (or other CPE serviced by it) can then begin to receive, transmit and/or store the multicast content for consumption by a user. The gateway 311 can also simply forward the received multicast stream to the CPE device, but identify the content as being the requested unicast stream that the device requested in step 708. So, for example, the gateway 311 can respond to the device's request (e.g., its request for a unicast stream of the requested content) by supplying a multicast stream in step 809, and yet still identify the multicast stream as a unicast stream.

In some embodiments, the multicast controller 308 may use a periodic message (e.g., a heartbeat message) to confirm or monitor that the requesting device is still using the requesting multicast. For example, if no heartbeat message is received from the requesting device (or its gateway 311) for a predetermined amount of time (e.g., 5 minutes), the multicast controller 308 can automatically terminate a multicast session (or decrement a group member count by one to remove the requesting device from the membership list, which may result in termination of the multicast session if there are insufficient remaining subscribers to justify the group).

The heartbeat message may include an HTTP POST request message from the gateway 311 to the controller 308, as illustrated in step 810. The heartbeat message can identify the gateway 311 (Device ID), and can also contain a list of the active cache fill operations that the gateway 311 is receiving and using. The list can identify the Content Path, Profile Name, Server Multicast Source and Server Multicast Group parameters discussed above, to identify those multicast streams that are in use. The gateway 311 can maintain an internal timer, and automatically transmit the heartbeat at the required intervals.

In step 811, the controller 308 can transmit a response to the gateway 311, confirming that the heartbeat was received.

FIG. 9 illustrates an example teardown sequence when a gateway 311 determines that it no longer needs to receive or subscribe to a particular multicast session (e.g., if the requesting device is turned off, or if the user changes channels to view different content). In step 901, the gateway 311 may determine that the stream is no longer needed.

In step 902, the gateway can transmit a multicast leave message to the termination system 310, and in step 903 the termination system can send a corresponding multicast leave message to the multicast server 307. These messages can identify the Server Multicast Source and Group parameters discussed above, identifying a particular multicast stream that is no longer needed by the gateway 311. In response, the termination system 310 and multicast server 307 may remove the gateway 311 from the list of addressees in the specified multicast stream(s).

In some embodiments, the session manager 309 may monitor the membership of the various multicast feeds for content, and in step 904, the gateway 311 may transmit a cache teardown request to the multicast controller 308. The message may be a POST Request message, and may contain similar parameters as the cache fill setup message 801. The multicast controller 308 may then transmit a cache teardown request message to the session manager 309 (containing similar parameters as the cache setup message 802), and subsequent corresponding responses can be sent from the session manager 309 in step 906 and the multicast controller 308 in step 907, reporting back the results of the teardown request.

Figure 10:
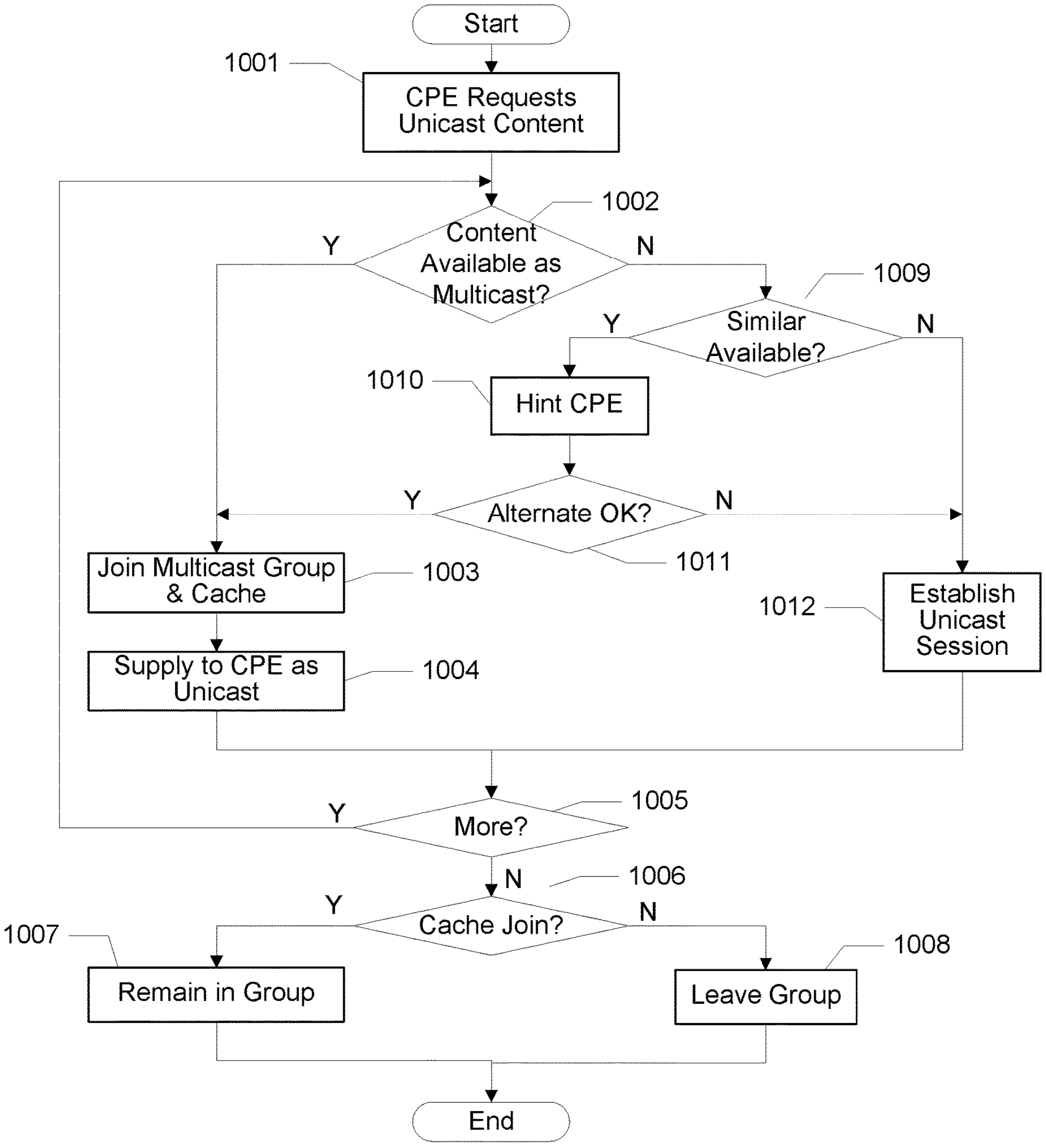
FIG. 10 illustrates an example process for using multicast bandwidth in accordance with one or more aspects of the disclosure.

The signaling flow diagrams discussed above illustrate example processes that can occur for supplying multicast content. FIG. 10 illustrates an alternative view of those processes and signals, to help illustrate an example logical flow. The FIG. 10 example process can begin when a user of a CPE device (e.g., a display device, a computer, a set-top box, a mobile device, etc.) decides to access content. This can occur, for example, when a user views an electronic program guide listing of available video programs, and chooses one to watch. In step 1001, the user's CPE may transmit a request to the CPE's gateway 311, indicating the desire for a unicast session to watch the selected program. This can use, for example, the signaling of step 708 discussed above.

In response, the gateway 311 may determine, in step 1002, whether the requested content is available as a multicast signal from a multicast server 307 serving the gateway 311. The requested content here may simply be data or a video program, but it can be a specific version of the data or program as well (e.g., coded using a particular encoder, encrypted in a particular encryption, having a predetermined resolution (e.g., high definition, standard definition, etc.), having predetermined digital rights management parameters, sized for a predetermined average (or minimum or maximum) transmission bitrate, etc.). To make this determination, the gateway 311 may consult a stored copy of the multicast listing received in steps 702 or 705.

If the desired version of the desired content is available as a multicast stream, then the gateway 311 can proceed to step 1003, and join the multicast group session by using, for example, the signaling of FIG. 8. Additionally, the gateway 311 can begin to cache the content as it is received, storing it in a memory, such as a temporary portion of RAM 203.

In step 1004, the gateway 311 can transmit the received content to the requesting CPE. In doing so, the gateway 311 can package the content as if it were the same unicast-type session requested in step 1001. Accordingly, the CPE may be indifferent, and unaware, of the fact that the gateway 311 has used a multicast session to obtain the content in the unicast request.

In step 1005, the gateway 311 can determine if there are more portions of the requested content to follow. As noted above, a piece of content may be fragmented and subdivided for treatment as distinct portions. A 30-minute television program may be divided into six separate files, each containing five minutes of the program. In the step 1005 determination, the gateway may determine whether the next portion of the program is desired. If it is, then the process can return to step 1002 to retrieve the next portion of the program.

If it is not (e.g., if the user has changed channels away from the originally requested content, or if the original program has ended), then the gateway can proceed to step 1006, and determine if the group join should be cached. In other words, the gateway 311 can determine whether it should remain a member of the multicast group carrying the originally-requested content. To make this determination, the gateway 311 can consult any of a number of predefined parameters. For example, the gateway 311 can be configured to remain a member of a group for a predetermined period of time (e.g., 5 minutes) after the user changes channels. By doing so, the gateway 311 can quickly receive the content again should the user return to the original channel, skipping some of the initial signaling used in step 1003 to first join the group, and allowing for a faster channel change.

Another example parameter may be based on the user's preferences. A user can designate certain programs, services, or channels as favorites, and the gateway 311 can cache a group join involving those programs, services, or channels for a longer period of time than for other programs, services, or channels.

Note that in the cache join of step 1006, the underlying content itself need not be cached when the user is no longer watching the originally requested program. Instead, the cache join 1006 may simply retain the fact that the gateway 311 has joined the group.

If a cache join is desired, then in step 1007, the gateway 311 may remain a member of the originally-requested group. Going forward, while the user is not watching the program in this multicast group, the gateway need not actually store the incoming multicast packets of that group, but the gateway can simply retain membership in the group. In some embodiments, remaining a member of the group in step 1007 need not involve any additional processing at all—the gateway 311 may simply do nothing to leave the group, and/or send periodic heartbeat messages to keep its membership in the group active.

If a cache join is not desired, then in step 1008, the gateway 311 can take steps to leave the group. This can involve, for example, the signaling of FIG. 9.

Back in step 1002, a determination was made if requested content was available as a multicast. If it was not available, then in step 1009, the gateway 311 can determine whether a similar version of the content is available as a multicast. A similar version may be the same underlying content title (e.g., the same movie, television show, etc.), but having different characteristics from that requested. For example, a multicast group may exist carrying a version of the movie, but at a different bitrate from the desired bitrate; or using a different encoding algorithm from that originally requested; or at a different screen resolution or size from that requested.

If a similar version of the requested content is available, then the gateway may, in step 1010, offer a hint, query, or suggestion to the requesting CPE device regarding the similar content version. This hint may simply be a message to the CPE indicating that the requested content is available in a different version from that originally requested, and may identify the relevant difference from the original request. The CPE may process this and determine whether the other (alternate) version is acceptable. For example, it may be acceptable if the CPE happens to have the correct decoder, bandwidth, display resolution, etc. to accommodate the different version. The CPE can also display a prompt to the user, asking if a slightly different resolution/bitrate/etc. version would be acceptable. The gateway 311 may then receive (at step 1011) an indication from the CPE as to whether the alternate version is acceptable.

If the alternate is acceptable, then the gateway 311 can proceed to step 1003, and join the multicast group carrying that alternate version. If the alternate is not acceptable, then in step 1012, the gateway can proceed with establishing a unicast session for the content, in accordance with the original request. The gateway 311 can also establish this unicast session if, in step 1009, a similar version of the requested content was not available as a multicast.

In the discussion above, the gateway 311 may determine in step 1005 that more content is desired (e.g., more fragments of the requested program are going to be sent or are available in the multicast), and return to step 1002. In doing so, the gateway 311 may retain knowledge of the previously joined multicast group, and immediately proceed to step 1003 (to receive the next portion the multicast). Alternatively, the gateway 311 can conduct a new determination of the availability of the content as a multicast. This new determination may be useful, for example, should the original multicast experience an error (e.g., a missed packet), or be torn down due to lack of membership numbers. In that situation, what was once available might no longer be available, and the gateway 311 can establish a unicast session (at step 1012) instead. So, the gateway 311 can convert from a multicast to a unicast session during the course of a program, and the CPE need not even be aware of any change.

Using some of the above described features, quality of service terms can be enforced at the termination system 310 for multicast streams. For example, if the termination system 310 determines that the available bandwidth leading to the gateway 311 (and other gateways serviced by the termination system) is running low, the termination system can further reduce the number of unicast streams in the system by increasing the number of multicast streams, and forcing users and CPE devices to accept similar alternatives identified in step 1009. The termination system can also lower the bitrate of the various multicast streams, and cause future requests for higher bitrate versions to be diverted to the lower bitrate similar versions instead.

Figure 11:
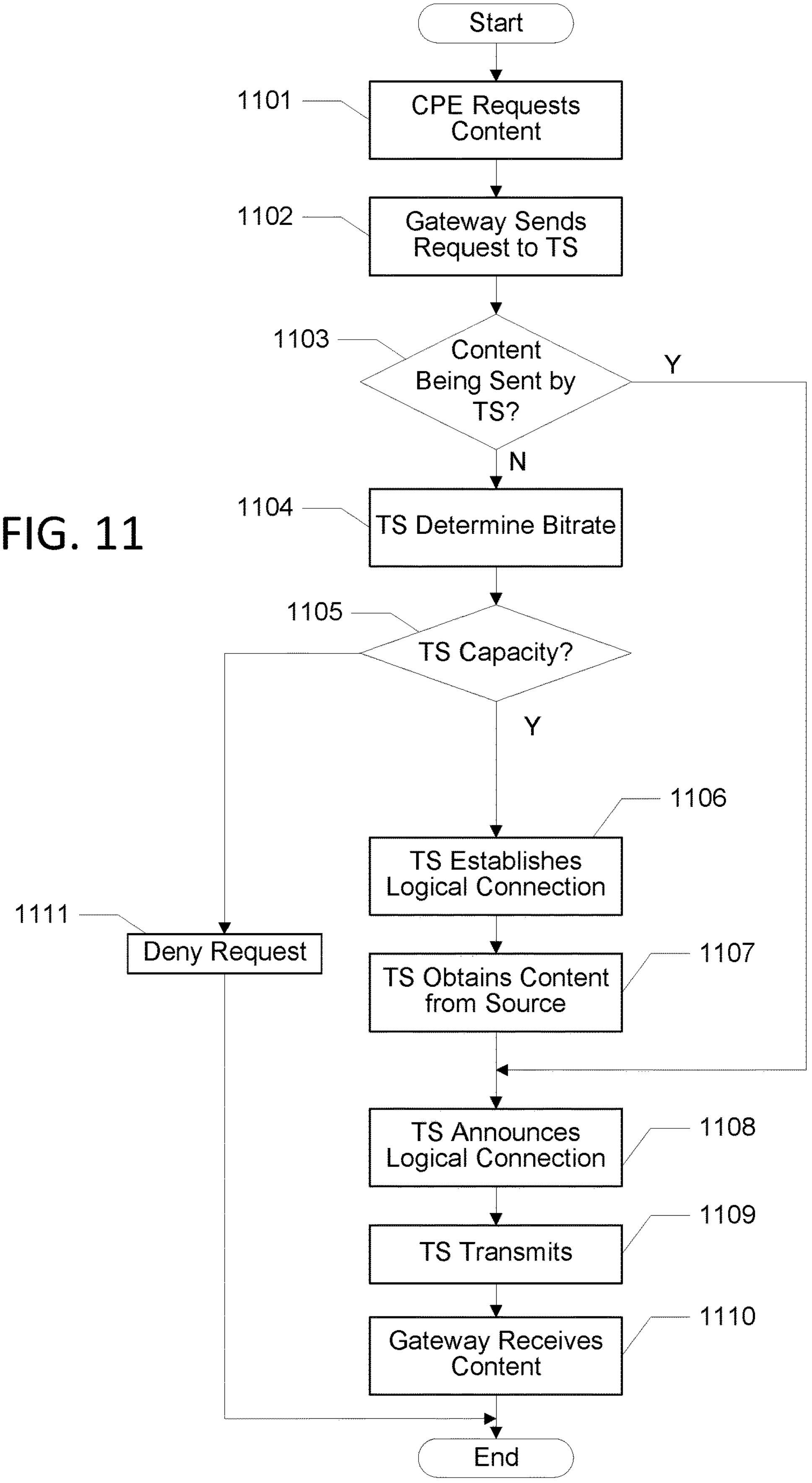
FIG. 11 illustrates an example process for handling a content request in accordance with one or more aspects of the disclosure.

FIG. 11 illustrates an example process in which a consumption device requests content. In step 1101, a consumption device (e.g., CPE 312*a*) may issue a request for content to its corresponding gateway 311. The request may be entered, for example, by a user who views an electronic program guide on the CPE 312*a*, and makes a selection therefrom.

In step 1102, the gateway 311 may send a request for the content to the termination system 310, which may be a DOCSIS cable modem termination system (CMTS). Alternatively, as discussed above, the CPE may communicate directly with the termination system 310 or servers 308/309. The request itself may be sent, for example, using a multicast protocol message, such as PacketCable Multimedia (PCMM) from Cablelabs or Internet Group Management Protocol (IGMP) from the IETF (Internet Engineering Task Force). The message may include a source identifier field and a group identifier field, which can normally identify a source address of multicast content and a group identifier identifying the multicast group (the group identifier can be resolved during routing into a group of destination addresses for eventual unicast delivery to the members of the multicast group). However, in some embodiments, the group identifier can be used for a different purpose. In some embodiments, the group identifier can identify a bitrate value for the requesting device (e.g., the requesting consumption device or CPE). The bitrate value can identify, for example, the average, minimum, and/or maximum bitrate that the consuming device can receive via its connection to the gateway 311, or the bitrate needed to support the requested content. For example, the requested content can be a variable bitrate (VBR) content.

In step 1103, the TS 310 can determine if the requested content is already being transmitted by the TS on any of its downstream channels, such as a downstream logical channel. If the content is not already being sent, the TS 310 may use the group identifier value from the request to determine the bitrate capacity (or demand) of the requesting consuming device CPE in step 1104.

In step 1105, the TS can determine if it has sufficient capacity to initiate a new logical downstream transmission carrying the requested content at the requested bitrate. If it has capacity, the TS can proceed to step 1106, and establish a new logical connection to the gateway 311. The logical connection can be any desired type of communication connection, such as a secure session.

In step 1107, the TS can obtain the requested content from its source. Obtaining this content can be done in any desired manner, such as using a PIM (Protocol Independent Multimedia) session.

In step 1108, the TS may announce the logical connection to the gateway 311. This can include, for example, informing the gateway of the address, encryption, encoding, bitrate, channel location, and any other information to inform the TS of how to locate, receive, decrypt and decode the content to be sent in the logical connection.

In step 1109, the TS may begin to transmit the requested content on the logical channel it created, and in step 1110 the gateway can receive the content and process it for delivery to the requesting consumption device CPE. After the requesting device ceases to consume the content (e.g., if the user changes channels, or turns the device off), the TS can be informed of this by the gateway 311, and the TS can tear down the logical connection. In some embodiments, the TS can wait for a predetermined amount of time to pass before tearing down the connection, in case the device (or another device) returns to the content. Alternatively, a session may be torn down if its bandwidth is needed for a higher priority content.

Returning to step 1103, the TS may determine that it is already sending the requested content.

For example, this may occur the second time a gateway issues a request for content that's already been received and processed by the TS as discussed above. If the TS is already sending the requested content, then the TS can skip to step 1108, and announce the logical connection to the gateway.

Returning to step 1105, the TS may determine that it does not have the capacity to support the requested bitrate for the requested content. In that event, the TS can proceed to step 1111, and deny the requested connection, sending a response to the requesting gateway and consumption device. The denial may cause the requesting device to issue a new request for a lower bitrate version of the content.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings.

As an example, the same on-net consumption device can become an off-net consumption device if, for example, the device leaves a range of the gateway 311, and instead begins using a third party network to request the same content. For example, a cell phone can use an IEEE 802.11 wi-fi connection to receive content while a user is at home, and can instead use a cellular telephone connection to request and receive the same content while away from home. In both instances, the requesting cell phone can transmit its request, in the same format, to the same multicast controller 308 or session manager 309.

As another example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

The invention claimed is:

1. A method comprising:

receiving, by a multicast server and from a multicast controller, a multicast setup request;

selecting, based on a plurality of profiles associated with one or more versions of content and based on a bitrate associated with one or more computing devices associated with the multicast setup request, a streamer to provide the content to the one or more computing devices;

generating a multicast stream based on a version of the content provided by the streamer;

sending, to the one or more computing devices, the multicast stream;

sending, to the multicast controller, status information of the multicast stream, wherein the status information comprises a parameter identifying a bitrate associated with the sending of the multicast stream to the one or more computing devices; and receiving, from the multicast controller, an indication associated with delivery of the status information.

2. The method of claim 1, wherein each of the plurality of profiles comprises one or more characteristics associated with each of the one or more versions of the content.

3. The method of claim 2, wherein the one or more characteristics associated with each of the one or more versions of the content comprises at least one of:

a bitrate for the version of the content;

an encoding type for the version of the content;

a resolution for the version of the content;

a compression ratio for the version of the content; or an encryption type for the version of the content.

4. The method of claim 1, wherein each of the plurality of profiles comprises a location associated with each of the one or more versions of the content.

5. The method of claim 1, wherein the selecting further comprises:

comparing one or more first parameters associated with each one of the plurality of profiles with one or more second parameters; and selecting a version of content based on the one or more first parameters matching the one or more second parameters.

6. The method of claim 1, further comprising:

sending, to a content server and based on the selecting, a request for the version of content; and receiving, from the content server, the version of content.

7. The method of claim 1, further comprising:

requesting a version of content by sending an HTTP GET to a content server.

8. The method of claim 1, wherein the one or more computing devices comprise one or more gateways.

9. The method of claim 1, wherein the one or more computing devices comprise one or more user devices.

10. The method of claim 1, further comprising:

selecting, based on the plurality of profiles, a version of content from the one or more versions of content;

generating, based on the version of content, a second multicast stream; and sending, to one or more second computing devices, the second multicast stream.

11. A computing device comprising:

one or more processors; and memory storing instructions that, when executed by the one or more processors, cause the computing device to:

receive, from a multicast controller, a multicast setup request;

select, based on a plurality of profiles associated with one or more versions of content and based on a bitrate associated with one or more computing devices associated with the multicast setup request, a streamer to provide the content to the one or more computing devices;

generate a multicast stream based on a version of the content provided by the streamer;

send, to the one or more computing devices, the multicast stream;

send, to the multicast controller, status information of the multicast stream, wherein the status information comprises a parameter identifying a bitrate associated with the sending of the multicast stream to the one or more computing devices; and receive, from the multicast controller, an indication associated with delivery of the status information.

12. The computing device of claim 11, wherein:

each of the plurality of profiles comprises one or more characteristics associated with each of the one or more versions of the content, and the one or more characteristics associated with each of the one or more versions of the content comprises at least one of:

a bitrate for the version of the content;

an encoding type for the version of the content;

a resolution for the version of the content;

a compression ratio for the version of the content; or an encryption type for the version of the content.

13. The computing device of claim 11, wherein each of the plurality of profiles comprises a location associated with each of the one or more versions of the content.

14. The computing device of claim 11, wherein the instructions, when executed by the one or more processors, cause the computing device to:

compare one or more first parameters associated with each one of the plurality of profiles with one or more second parameters; and select the version of content based on the one or more first parameters matching the one or more second parameters.

15. The computing device of claim 11, wherein the instructions, when executed by the one or more processors, cause the computing device to:

request, from a content server and based on the selecting, a version of content; and receive, from the content server, the version of content.

16. The computing device of claim 11, wherein the instructions, when executed by the one or more processors, cause the computing device to:

select, based on the plurality of profiles, a version of content from the one or more versions of content;

generate, based on the version of content, a second multicast stream; and send, to one or more second computing devices, the second multicast stream.

17. A system comprising:

a multicast server; and a multicast controller, wherein the multicast server is configured to:

receive, from the multicast controller, a multicast setup request;

select, based on a plurality of profiles associated with one or more versions of content and based on a bitrate associated with one or more computing devices associated with the multicast setup request, a streamer to provide the content to the one or more computing devices;

generate a multicast stream based on a version of the content provided by the streamer;

send, to the one or more computing devices, the multicast stream, send, to the multicast controller, status information of the multicast stream, wherein the status information comprises a parameter identifying a bitrate associated with the sending of the multicast stream to the one or more computing devices; and receive, from the multicast controller, an indication associated with delivery of the status information; and wherein the multicast controller is configured to:

send, to the multicast server, the multicast setup request; and send, to the multicast server, the indication.

18. The system of claim 17, further comprising:

the streamer configured to:

receive, from the multicast server, a request for the content; and send the content.

19. The system of claim 18, wherein the request comprises an HTTP GET.

20. The system of claim 17, wherein the multicast server is further configured to:

compare one or more first parameters associated with each one of the plurality of profiles with one or more second parameters; and select a version of content based on the one or more first parameters matching the one or more second parameters.

* * * * *